Nov. 26, 1963 R. O. WILSON 3,111,697
SCREW-SLOTTING AND BURRING MACHINE
Filed March 27, 1961 3 Sheets-Sheet 2
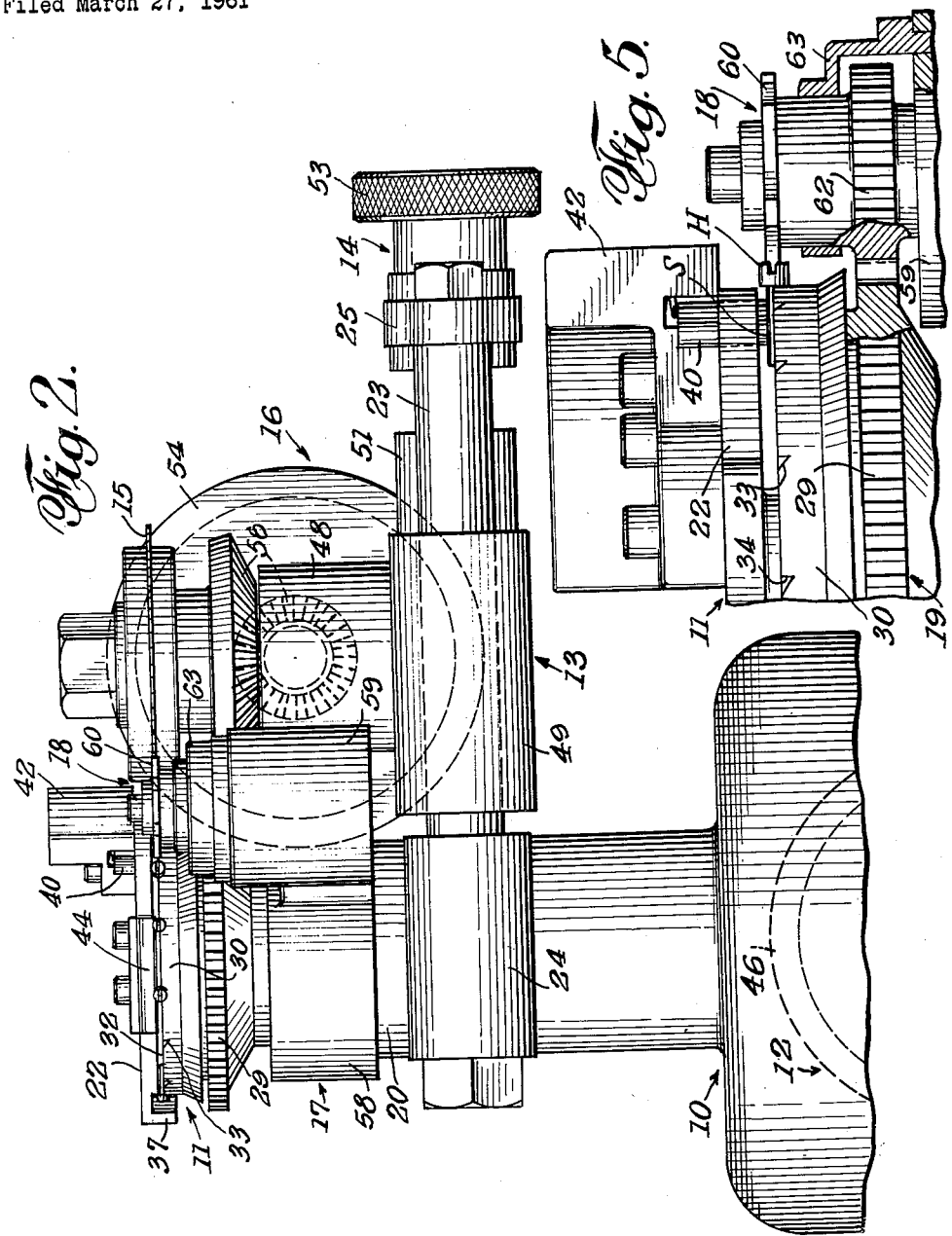
INVENTOR.
RAYMOND O. WILSON
BY C. S. Stratton
ATTORNEY Nov. 26, 1963     R. O. WILSON     3,111,697
SCREW-SLOTTING AND BURRING MACHINE
Filed March 27, 1961     3 Sheets-Sheet 3
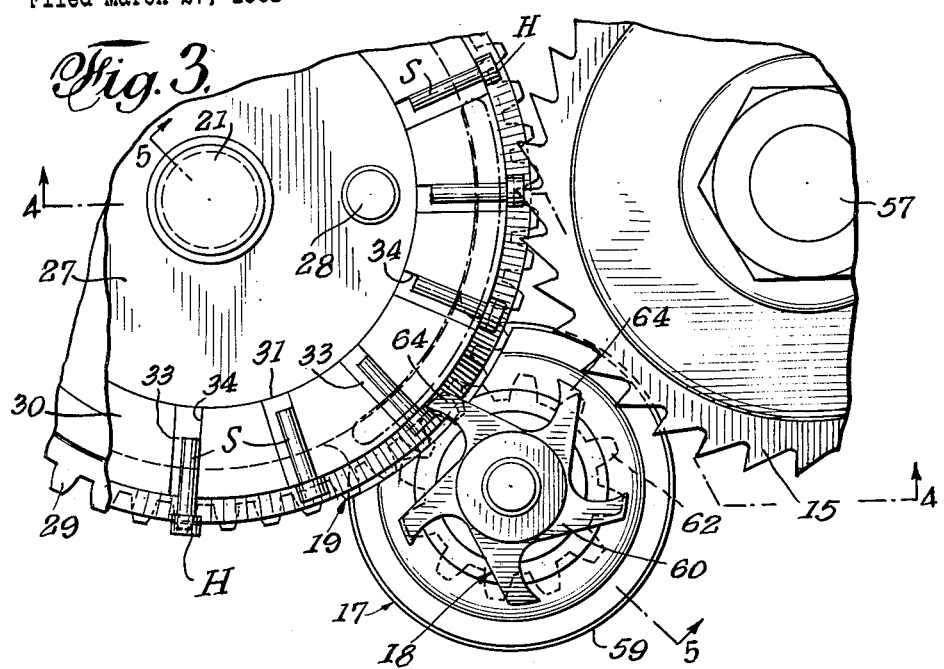
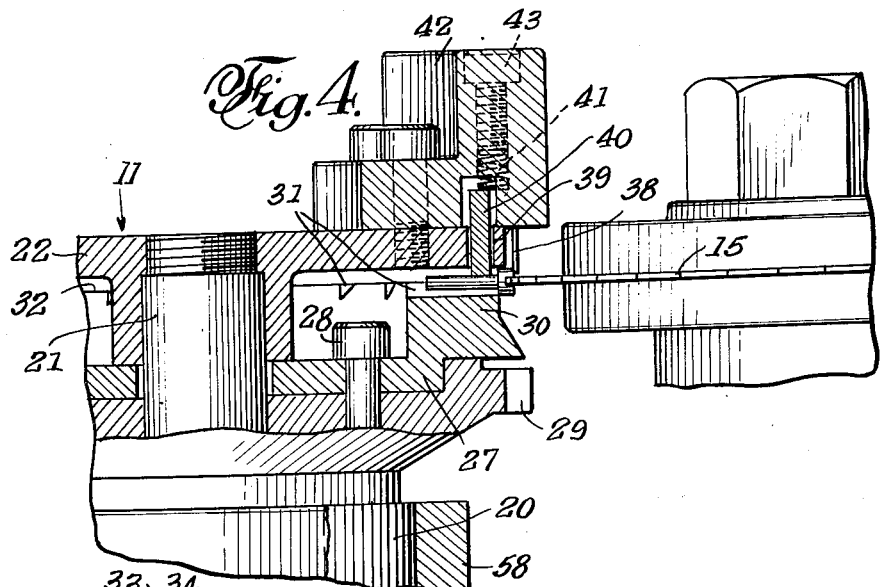
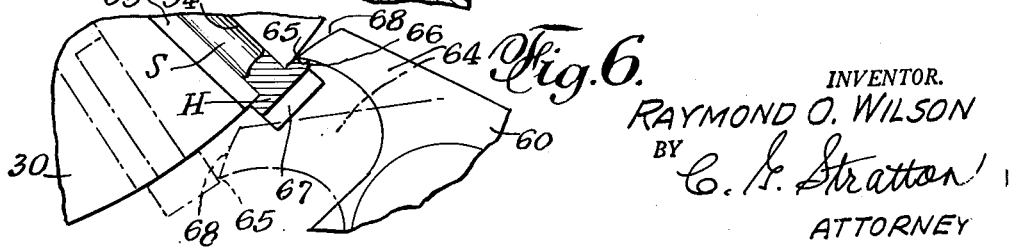
INVENTOR.
RAYMOND O. WILSON
BY
ATTORNEY

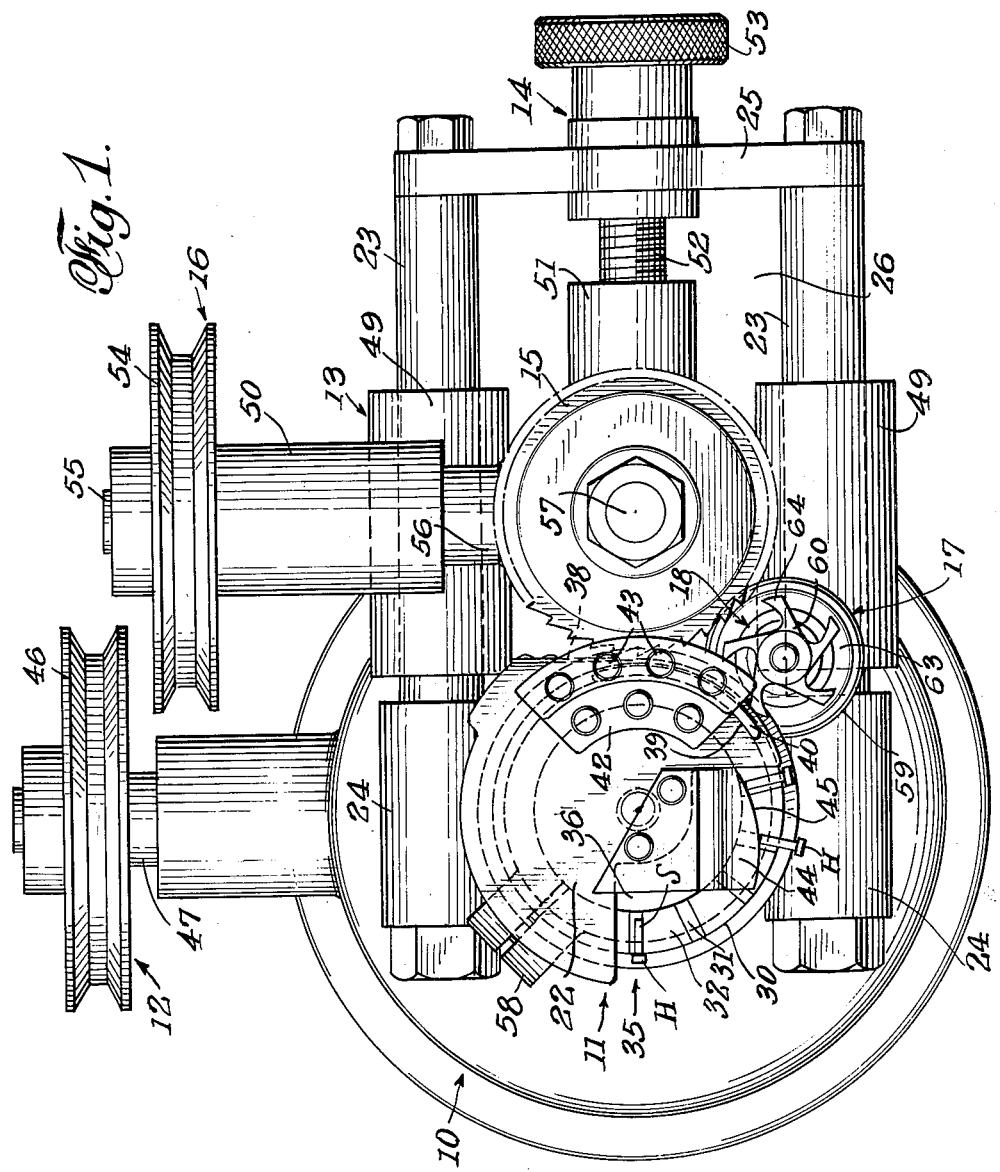

United States Patent Office 3,111,697
Patented Nov. 26, 1963

3,111,697
SCREW-SLOTTING AND BURRING MACHINE
Raymond O. Wilson, San Marino, Calif., assignor to Olympic Screw & Rivet Corporation, Downey, Calif., a corporation of California
Filed Mar. 27, 1961, Ser. No. 98,615
6 Claims. (Cl. 10—6)

This invention relates to a machine for slotting the heads of screws and removing the burrs that ordinarily form during the slotting operation.

An object of the present invention is to provide a machine in which cap screws or other screws having cylindrical heads are moved continuously and, while so moved, have their heads successively slotted and burred, thereby including the burring operation within the time needed for slotting and discharge of the screws from the machine.

Another object of the invention is to provide, in a machine of the character above referred to, slotting and burring elements that have movement opposite to each other while screws are successively moved therepast, the burring element, thereby, moving to remove the burrs in a direction counter to the burr-forming movement of the slotting element.

A further object of the invention is to provide, in a machine of the type referred to, for movement of the screws in an arcuate path and of the burring element in a tangential arcuate path, so that the burring element, after engaging the burrs on said screws, removes the same by a sliding or wiping, cutting movement.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a top plan view of a screw-slotting and burring machine embodying the features of the present invention.

FIG. 2 is a side elevational view thereof as seen from the lower side of FIG. 1, with the base of the machine broken away.

FIG. 3 is an enlarged and broken plan view of the slotting and burring means of the machine.

FIGS. 4 and 5 are vertical sectional views as taken on the respective lines 4—4 and 5—5 of FIG. 3.

FIG. 6 is a further enlarged detail view illustrating the burring operation.

The screw-slotting and burring machine that is illustrated comprises, generally, a base 10, a screw-carrier head 11 carried by said base, means 12 to drive the head, a first auxiliary base 13 adjustably carried by the base 10, means 14 to adjust the position of the auxiliary base 13 relative to the head 11, a screw-slotting cutter 15 carried by the auxiliary base 13, means 16 to drive said cutter independently of the drive 12 of the head 11, a second auxiliary base 17 carried by the base 10, burring means 18 carried by the auxiliary base 17, and a drive connection 19 between the head 11 and the burring means 18.

The base 10 is shown as having an upper extension 20 (FIG. 4) that serves as a bearing for the carrier head 11, a fixed stud 21 extending axially through said extension, and a cap plate 22 being carried by said stud in overstanding relation to the head 11. As best seen in FIGS. 1 and 2, said base 10 is provided with a pair of laterally-extending mounting bars 23 that are affixed to ears 24 formed on the base extension 20. The ends of said bars 23 are connected by a cross member 25 to enclose a space 26 that is defined by the base extension 20, the bars 23, and said member 25.

The carrier head 11 is shown as a turret plate 27 that is affixed, as by bolts or screws 28, to the driver gear 29 of the drive connection 19. Said turret plate 27 is formed with a crown portion 30 in the upper face of which is provided a uniformly-spaced complement of radial seats 31 in which are disposed the shanks S of screws with their heads H disposed outwardly of but adjacent to the peripheral face of said crown portion 30. While a screw-feeding means is not shown, it will be understood that any conventional feed chute may be provided to deposit screws gravitationally against the top face 32 of the crown portion 30 so that said screws may drop into the successive seats 31 as the head is rotated—in this case, clockwise.

To insure that the screw shanks S slide readily into their seats, the latter are each formed with a sloping base face 33 down which the screw shanks S may roll as the same enter the seats, and with an abutment or shoulder wall 34 that limits the position of the screws in their seats and constitutes a positive means for effecting carrier movement of the screws with the turret plate 27. In this manner, the screws are loosely disposed on the turret plate and yet are positively transported from the feed station at 35 in a clockwise direction to be first slotted, then burred, and finally discharged from the machine. It will be noted particularly from FIG. 4 that the screw shanks S lie partly in their seats 31 and partly above the level of the top face 32 of the turret plate 27.

The cap plate 22 has a cutout 36 that exposes the station 35 where the screws are fed to the head and also the stations beyond where the burring occurs, so that discharge of the screws may be effected. The plate 22, from said station 35 to a point before the slotting occurs, is provided with a skirt 37 that serves to retain the screws against displacement outwardly from the ends of seats 31 during transport from feed to slotting stations. Beyond the end of said skirt, the cap plate is provided with a leaf spring 38 that bears lightly on the end faces of the screw heads H as the same approach the slotting station.

The plate 22 carries means to hold the screws non-rotational on their axes as they move past both the slotting station and the station where the same are burred. To this end, the plate 22 is provided with an arcuate slot 39, adjacent its periphery, to accommodate a pressure shoe 40 that, by means of springs 41, is biased to resiliently press against the screw shanks while the same slide therebeneath under carrier drive of the shoulder walls 34 of the seats 31. A bracket 42 affixed to the cap plate 22 is provided with cap screws 43 that compress the springs 41 to create the mentioned bias on the shoe 40.

After screws pass by the far end of said shoe, they are freed for endwise displacement from their seats. The same is accomplished by a member 44 residing in the cutout 36, is carried by the cap plate 22, and has an edge 45 that, by engaging the inner ends of the screw shanks S, displaces the screws radially from the seats. This can be clearly seen in FIG. 1, it being understood that a suitable discharge chute may be provided to guide the screws to a collecting receptacle or to a place where the shanks thereof may each be provided with a thread, if such thread has not previously been provided.

The means 12 to drive the turret plate 27 is represented by a driving pulley 46 on a shaft 47 having bearing in the base 10 and connected by suitable bevel gearing to drive the gear 29 and, therefore, said plate 27. The type of drive used is not important except that the speed of rotation of turret plate 27 is advantageously substantially slower than the speed of drive of the cutter 15.

The first auxiliary base 13 is shown as a body 48 provided with bearing extensions 49 that are slidingly engaged with the bars 23 to hold the body 48 upright. Above one of the extensions 49, the base 13 is provided with a bearing extension 50 that is transverse to the bearing extensions 49. Between the bearing extensions 49 and parallel thereto, an internally threaded boss 51 extends from the body 48 in a direction opposite to the base 20.

The position-adjusting means 14 is shown as a lead screw 52 that is engaged with the threads of boss 51 and is rotationally carried by the cross member 25. Said means 14 is provided with an adjusting knob 53, it being clear that the auxiliary base 13 may be adjusted along the slide bars 23 by rotation of the knob 53.

The cutter 15 comprises a toothed disc that is carried by the body 48 in a plane aligned with the plane on which the axes of the screws on the carrier head 11 are disposed. The mentioned adjustment of the base 13 is made according to the depth to which the screw heads H are to be slotted, such relationship of cutter edge and screw heads being shown in FIGS. 3 and 4.

The driving means 16 for the cutter 15 comprises a drive pulley 54 on a shaft 55 extending through the bearing extension 50, and a pair of bevel gears 56 connecting said shaft 55 and the shaft 57 that has bearing in the body 48 and mounts the cutter 15.

The second auxiliary base 17 is carried by the upper extension 20 of the main base 10. Said base 17 is shown as a clamp collar 58 encircling said extension 20, and a bearing 59 formed as a lateral extension of said collar, the same being outward of the periphery of the carrier head 11. Said auxiliary base 17 is adjustable around the axis of the extension 20 and, therefore, of the turret plate 27, so that the vertical axis of bearing 59 may be adjusted around the turret axis to locate said bearing 59 in desired relationship to and beyond the slotting station.

The burring means 18 is shown as a cutter 60 on a shaft journalled in the bearing 59, a gear 62 being provided on said shaft to cooperate with the gear 29 to constitute the driving connection 19 between the carrier head 11 and the cutter 60.

A shield 63 covers the gear 62.

It will be noted that the cylindrical faces of the screws extend in a substantially radial direction from the peripheral face of the crown portion 30 of the head 11.

In this case, the axes of the carrier head 11 and the cutter 60 are driven on a three-to-one relationship. Therefore, the turret plate 27 is provided with fifteen seats for screws, and the cutter 60 is formed to have five arms 64. As a consequence, the screw heads H and the cutter arms 64 move oppositely to but at the same linear speed as said heads and cutter arms. By setting the arms 64 so that the burring edges 65 thereof engage against burrs 66 on the ends of the slots 67 formed by the cutter 15, the mentioned travel at the same peripheral speed as said cutter edges 65 and the screw heads H causes said edges to wipe along the heads from the full-line position of FIG. 6 to the dot-dash line position, when the edges 65 leave the heads, thereby dislodging and/or cutting any burrs that may be formed as described. It will be noted from FIG. 5 that said cutter arms 64 are thicker than the cutter 15, thereby insuring that said edges are at all times engaged with the screw heads during burring. In FIG. 3 of the drawing it will be seen that the cutting or burring edge of the rotary burring tool contacts the screw head at a point lying substantially in a plane containing the axes of the cylindrical mounting means and rotary burring tool, respectively, and this point of contact is adjacent the inner edge of the slot in the screw head.

In cases where the outer edges 68 of the cutter arms 64 are on a diameter coincident with the pitch circle of the gear 62, the peripheral travel of the cutter edges 65 will be the same as that of any point on the pitch circle of said gear. If, however, the diameter of the outer edges 68 of the cutter arms 64 is greater than the pitch circle of gear 62 (the outer diameter of the turret plate 22 being made smaller accordingly), the peripheral travel of the cutter edges 65 will be greater than that of the pitch circle of gear 62. Therefore, the edges 65, in addition to wiping over the cylindrical faces of the screw heads, as above described, will exert pressure against said heads to increase the burr-removing efficiency of the edges 65. If this increased travel of an edge 65 relatively to a head which it is burring is in the nature of three thousandths to five thousandths of an inch, it will be clear that there is a progressively increasing cutting pressure by the edges 65 on the heads H, yet the drive remains proportional to the number of screw seats 31 on the turret plate 27 and cutter arms 64 on the cutter 60.

The screws may move under the wiping pressure of the burring edges 65. The movement, if any, is slight, the shoe 40 yielding to the pressure to allow the screws to slide up on the sloping faces 33 of the seats 31. Since only a few thousandths of an inch are involved in such movement, there is no possibility of a screw working out of its seat while being burred.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A screw-slotting and burring machine for screws having cylindrical heads comprising a continuously rotating turret having seats for the shanks of screws with the heads thereof extending substantially radially beyond the periphery of the turret, means to slot the screw heads successively as the same move with the turret, a rotating burring tool located to remove burrs on the trailing side of the head formed by the means to slot the heads while successive heads are being slotted, said tool being provided with a plurality of burring arms that have transverse burr cutting edges that move in an arcuate path tangent to the periphery of the turret and contact the screw head at a point lying substantially in a plane containing the axes of the continuously rotating turret and rotary burring tool, respectively, to provide wiping contact with the trailing portions of the heads, said turret and burring tool being disposed to rotate on parallel axes.

2. A screw-slotting and burring machine according to claim 1 in which the slotting means comprises a rotary disc cutter, said cutter and the turret rotating in the same direction, whereby the slotting periphery of the cutter moves counter to the travel of the screw heads, and means to rotate the burring tool in the opposite direction to the turret, whereby the burring arms and the screw heads move together while in wiping contact.

3. A screw-slotting and burring machine according to claim 2 in which a geared connection is provided between the turret and burring tool to provide a proportional movement of said screw head and tool arms.

4. A screw-slotting and burring machine according to claim 2 in which a geared connection is provided between the turret and burring tool to provide a proportional movement of said screw heads and the cutting edges of the tool arms, said connection comprising two gears, one connected to the turret and the other to the tool, having tangent pitch circles, the circumferential path of the burring tool cutting edges being greater than the pitch circle of the gear connected thereto, and the circumferential path of the screw heads carried by the turret being commensurately smaller than the pitch circle of the other gear, such difference of proportion being such as to circumferentially move each burring edge relatively to a screw head being burred thereby a distance approximately three thousandths to five thousandths of an inch greater than the circumferential movement of the head.

5. In a machine for burring the slots formed in the heads of screws while said heads are moved in a circumferential path about an axis of a turret, a burring tool on a parallel axis and provided with a set of uniformly spaced burring arms terminating in transverse burring edges, a drive connection between said axes to move the heads and the burring arms in opposite directions at the same circumferential speed, said arms being set so the edges thereof engage the heads adjacent the inner edge of the slot when the burring edge is nearest the periphery of said turret during arcuate movement of the burring edge and trail the same while wiping thereagainst during such movement of the burring edge relative to the head, said drive connection comprising two gears, one on each axis, and having tangent pitch circles, the burring edges of the burring arms being disposed on a circumference that much larger than the pitch circle of the gear on the axis of the burring tool as to circumferentially move each burring edge relatively to a screw head being burred thereby a distance approximately three thousandths to five thousandths of an inch greater than the circumferential movement of the head.

6. In a burring machine, cylindrical means mounting a screw with its slotted cylindrical head extending radially of the periphery of said means from an axis of rotation of said mounting means and with the burred end of the slot trailing, a rotary burring tool provided with a burring edge and mounted on an axis parallel to the axis of the screw-mounting means, gearing connecting said mounting means and said tool to move the screw head and the burring edge together on their respective axes of rotation, said burring edge being closely adjacent to the cylindrical periphery of the mounting means and contacting the screw head at a point lying substantially in a plane containing the axes of the cylindrical mounting means and rotary burring tool, respectively, said screw head and burring edge moving arcuately oppositely during continued movement of the screw head and burring edge, thereby causing said edge to wipe along said trailing side of the screw head and to remove the burr thereof.

References Cited in the file of this patent

UNITED STATES PATENTS

| | | |
|---|---|---|
| 2,621,343 | Fray | Dec. 16, 1952 |
| 2,741,784 | Fray | Apr. 17, 1956 |
| 2,762,064 | Byam et al. | Sept. 11, 1956 |